United States Patent [19]
Ota

[11] Patent Number: 5,975,775
[45] Date of Patent: Nov. 2, 1999

[54] INFORMATION RECORDING APPARATUS AND PROGRAM STORAGE DEVICE READABLE BY THE APPARATUS HAVING EMULATION PROCESSING WITH ERROR RECOVERY

[75] Inventor: Yuichi Ota, Nagoya, Japan

[73] Assignee: Brother Kogyo Kabushiki Kaisha, Nagoya, Japan

[21] Appl. No.: 08/895,629

[22] Filed: Jul. 17, 1997

[30] Foreign Application Priority Data

Jul. 18, 1996 [JP] Japan .................................. 8-189279

[51] Int. Cl.[6] ................................ B41J 5/30; B41J 15/00
[52] U.S. Cl. ................................ 400/62; 400/74; 395/112; 395/115
[58] Field of Search .................................. 400/61, 62, 63, 400/70, 74, 76; 395/112, 115, 116

[56] References Cited

U.S. PATENT DOCUMENTS

| | | |
|---|---|---|
| 4,968,159 | 11/1990 | Sasaki et al. . |
| 5,295,233 | 3/1994 | Ota . |
| 5,306,102 | 4/1994 | Ota . |
| 5,332,320 | 7/1994 | Ohara ........................................ 400/76 |
| 5,467,432 | 11/1995 | Ota . |
| 5,511,149 | 4/1996 | Hayano ................................... 395/112 |
| 5,721,880 | 2/1998 | McNeill, Jr. et al. .................. 395/500 |
| 5,751,430 | 5/1998 | Koike ..................................... 358/296 |
| 5,799,206 | 8/1998 | Kitagawa et al. ...................... 395/856 |

*Primary Examiner*—John Hilten
*Attorney, Agent, or Firm*—Oliff & Berridge, PLC

[57] ABSTRACT

Each of record information blocks in various modes is divided into predetermined information units each having a head indicator indicating a head of respective one of the predetermined information units. An information recording apparatus, to which the record information blocks are inputted in time sequence for each of the modes, is provided with: an emulation device for emulating the predetermined information units one after another; an indicator memory device for temporarily storing the head indicator in a current information unit, which is one of the predetermined information units and is currently emulated by the emulation device, for a time duration while the current information unit is emulated; an update device for updating the head indicator, each time when an emulation for the current information unit is completed by the emulation device; and an error judgment device for judging whether or not an error is generated during the emulation for the current information unit. The emulation device re-emulates the current information unit, which is indicated by the head indicator stored in the indicator memory device, by use of one emulation method, which corresponds to a mode of the record information block including the current information unit and is different from another emulation method which has been used hitherto by the emulation device, when the error is generated according to a judgment by the error judgment device.

20 Claims, 3 Drawing Sheets

INFORMATION RECORDING APPARATUS AND PROGRAM STORAGE DEVICE READABLE BY THE APPARATUS HAVING EMULATION PROCESSING WITH ERROR RECOVERY

BACKGROUND OF THE INVENTION

1. Field of the Invention

The present invention relates to an information recording apparatus such as a printer apparatus, which receives a plurality of record information blocks in various modes to be emulated by different emulation methods from each other, emulates each of the received record information blocks and outputs the emulated record information blocks.

2. Description of the Related Art

There is an information recording apparatus such as a printer apparatus, which receives the record information outputted from an external processing device such as a computer, applies an appropriate emulation process to the received record information, and records the emulated record information onto a predetermined record sheet.

Incidentally, as a record information block outputted from the external processing device, there are a plurality of record information blocks in various modes, which require emulation processes for recording different from each other. As the modes for the record information blocks, for example, there are the Post Script (which is a registered trade mark owned by Adobe Systems Incorporated USA) mode (hereinbelow, it is referred to as a "PS mode") and the PCL (which is a registered trade mark owned by Hewlett Packard USA) mode and so on, which are known as the emulation process modes for the printers. These emulation process modes are different from each other by their programs etc. executed in the external processing devices. Therefore in the above mentioned information recording apparatus, the emulation process mode of the data is judged for each division of the data, and the emulation process mode is changed in case that the judged emulation process mode of the current division of the data is different from that of the previous division of the data, so as to process and output the data by the new mode, as explained in U.S. Pat. No. 4,968,159, U.S. Pat. No. 5,295,233, U.S. Pat. No. 5,306,102 and U.S. Pat. No. 5,467,432, for example.

Recently, one information recording apparatus is often commonly used for a plurality of external processing devices, or after executing different programs in one external processing device, the processed results of theses programs are often to be collectively recorded by one information recording apparatus. In other words, a plurality of record information blocks in various modes which require different emulation processes are often outputted continuously in time sequence with respect to one information recording apparatus.

However, in the above mentioned information recording apparatus, immediately after the record information block in the PS mode is inputted and the emulation process by the PS mode is executed with respect to this inputted record information block in the PS mode, if the record information block in the PCL mode is successively inputted after this record information block in the PS mode, the record information block in the PCL mode may not be precisely emulated or recorded depending upon the content of the record information block since the emulation process for the PS mode, which has been executed, may be performed with respect to the record information block in the PCL mode, which is a problem.

SUMMARY OF THE INVENTION

It is therefore an object of the present invention to provide an information recording apparatus, which can execute an emulation process suitable for each of record information blocks even if the record information blocks in various modes which require different emulation processes are successively inputted thereto, so that all of the record information blocks can be precisely emulated and recorded.

The above object of the present invention can be achieved by an information recording apparatus, to which record information blocks in various modes (e.g. the PS mode, the PCL mode and the like) are inputted in time sequence for each modes. Each of the record information blocks is divided into predetermined information units (e.g. command units or the like) each having a head indicator (e.g. a pointer or the like) indicating a head of respective one of the predetermined information units. The information recording apparatus is provided with: an emulation device for emulating the predetermined information units one after another; an indicator memory device for temporarily storing the head indicator in a current information unit, which is one of the predetermined information units and is currently emulated by the emulation device, for a time duration while the current information unit is emulated; an update device for updating the head indicator stored in the indicator memory device, each time when an emulation for the current information unit is completed by the emulation device; and an error judgment device for judging whether or not an error is generated during the emulation for the current information unit. The emulation device re-emulates the current information unit, which is indicated by the head indicator stored in the indicator memory device, by use of one emulation method, which corresponds to a mode of the record information block including the current information unit and is different from another emulation method which has been used hitherto by the emulation device, when the error is generated according to a judgment by the error judgment device. The information recording apparatus is also provided with: a recording device for recording the emulated information unit in case that the error is not generated according to the judgment and recording the re-emulated information unit in case that the error is generated according to the judgment.

According to the information recording apparatus of the present invention, the information units included in the record information blocks inputted in time sequence are emulated by use of an emulation method such as the PS method, the PCL method and the like, by the emulation device, such as a CPU or the like. During the emulation process, the head indicator in the current information unit is temporarily stored by the indicator memory device such as a pointer memory or the like, for a time duration while the current information unit is emulated. Then, the head indicator stored in the indicator memory device is updated by the update device such as a CPU or the like, each time when the emulation for the current information unit is completed by the emulation device. Along with this, it is judged by the judgment device whether or not an error is generated during the emulation for the current information unit. When the error is generated according to the judgment by the error judgment device such as a CPU or the like, the current information unit, which is indicated by the head indicator stored in the indicator memory device, is re-emulated by the emulation device, by use of one emulation method, which corresponds to a mode of the record information block including the current information unit and is different from another emulation method which has been used hitherto by the emulation device. Finally, the emulated information unit is recorded by the recording device, such as a printer engine or the like, in case that the error is not generated according to the judgment, and the re-emulated information unit is recorded by the recording device, in case that the error is generated according to the judgment.

Accordingly, since the current information unit is emulated again by use of the emulation method corresponding to the mode of the record information block including the current information unit on the basis of the head indicator for the current information unit at the time of the error generation, even if the record information blocks, which require different emulation methods from each other, are inputted continuously in time sequence, each of the record information blocks can be precisely emulated by use of the appropriate emulation method and thus can be precisely recorded according to the information recording apparatus of the present invention.

In one aspect of the information recording apparatus of the present invention, the error judgment device judges that the error is generated if the current information unit cannot be emulated by the emulation device.

According to this aspect, during the emulation process, if the current information unit cannot be emulated by the emulation device, it is judged by the error judgment device that the error is generated. Thus, it is possible to certainly judge that the current information unit should be emulated by use of the emulation method different from that used for the current information unit.

In another aspect of the information recording apparatus of the present invention, the emulation device is provided with a mode judgment device for judging the mode of the record information block including the current information unit when the error is generated. And that, the emulation device re-emulates the current information unit by use of one emulation method corresponding to the mode judged by the mode judgment device.

According to this aspect, during the emulation process, when the error is generated according to the judgment by the error judgment device, the mode of the record information block including the current information unit is judged or identified by the mode judgment device, such as a CPU or the like. Then, the current information unit is re-emulated by the emulation device by use of the emulation method corresponding to the mode judged by the mode judgment device. Thus, it is possible to precisely perform the emulation process by use of the emulation method appropriate for the current information unit indicated by the head indicator.

In this aspect, the information recording apparatus may be further provided with a notify device for notifying of a generation of the error if the mode judged by the mode judgment device is coincident with the mode of the record information block including the current information unit when the error is generated.

In this case, if the mode judged by the mode judgment device is coincident with the mode of the record information block including the current information unit when the error is generated, a generation of the error is notified by the notifying device such as a display device, a sound generation device or the like. Thus, since the user can recognize the generation of the error, it is possible for the user to promptly cope with this error.

In another aspect of the information recording apparatus of the present invention, the record information blocks are inputted from an external computer device. And that, the information recording apparatus is further provided with an I/O (Input/Output) interface for inputting the record information blocks from the external computer device into the apparatus.

According to this aspect, even if the record information blocks in various modes, which require different emulation methods from each other, are inputted from the external computer device or devices such as a personal computer or the like, the emulation process can be precisely performed by use of the appropriate emulation method for each mode.

In another aspect of the information recording apparatus of the present invention, the record information blocks are inputted from an external communication device. The information recording apparatus is further provided with an I/O (Input/Output) interface for inputting the record information blocks from the external communication device into the apparatus.

According to this aspect, even if the record information blocks in various modes, which require different emulation methods from each other, are inputted from the external communication device or devices such as a facsimile device or the like, the emulation process can be precisely performed by use of the appropriate emulation method for each mode.

In another aspect of the information recording apparatus of the present invention, the recording device may be a light beam type recording device for recording the emulated or re-emulated information units onto a predetermined record sheet by use of a light beam.

According to this aspect, since the recording device may be a light beam type recording device, such as a laser beam printer or the like, the information units can be recorded sharply on the record sheet.

In another aspect of the information recording apparatus of the present invention, the recording device is an ink jet type recording device for recording the emulated or re-emulated information units onto a predetermined record sheet by use of an ink jet.

According to this aspect, since the recording device is an ink jet type recording device, such as an ink jet printer or the like, it is possible to reduce the size of the recording device as well as the information recording apparatus as a whole.

In another aspect of the information recording apparatus of the present invention, the information recording apparatus is further provided with a buffer memory device for temporarily storing the inputted record information blocks. The emulation device emulates and re-emulates the information units stored in the buffer memory device.

According to this aspect, during the emulation process, the inputted record information blocks are temporarily stored by the buffer memory device. Then, the information units included in the record information blocks stored in the buffer memory device are emulated by the emulation device. Thus, the emulation process by use of the appropriate emulation method can be speedily and reliably performed.

The above object of the present invention can be also achieved by a program storage device readable by the above described information recording apparatus of the present invention. The program storage device tangibly embodies a program of instructions executable by the information recording apparatus to perform method processes for emulating each of the information units by use of an appropriate emulation method. The method processes are provided with: an emulation process of emulating the predetermined information units one after another; a storing process of temporarily storing, into an indicator memory device of the apparatus, the head indicator in a current information unit, which is one of the predetermined information units and is currently emulated by the emulation process, for a time duration while the current information unit is emulated; an update process of updating the head indicator stored in the indicator memory device, each time when an emulation for the current information unit is completed by the emulation process; an error judgment process of judging whether or not an error is generated during the emulation for the current information unit; a re-emulation process of re-emulating the current information unit, which is indicated by the head indicator stored in the indicator memory device, by use of one emulation method, which corresponds to a mode of the record information block including the current information unit and is different from another emulation method which has been used hitherto by the emulation process, when the error is generated according to a judgment by the error judgment process; and a recording process of recording the emulated information unit in case that the error is not generated according to the judgment and recording the re-emulated information unit in case that the error is generated according to the judgment.

According to the program storage device, such as a ROM (Read Only Memory), an IC (Integrated Circuit) Card, a CD-ROM (Compact Disc-ROM), a floppy disk or the like, of the present invention, the above described appropriate emulation process can be precisely performed as the information recording apparatus reads and executes the program of instructions.

In one aspect of the program storage device of the present invention, the error judgment process judges that the error is generated if the current information unit cannot be emulated by the emulation process. Thus, it is possible to certainly judge that the current information unit should be emulated by use of the emulation method different from that used for the current information unit.

In another aspect of the program storage device of the present invention, the emulation process is provided with a mode judgment process of judging the mode of the record information block including the current information unit when the error is generated. And that, the re-emulation process re-emulates the current information unit by use of one emulation method corresponding to the mode judged by the mode judgment process. Thus, it is possible to precisely perform the emulation process by use of the emulation method appropriate for the current information unit indicated by the head indicator.

In this aspect, the method processes may be further provided with a notify process of notifying of a generation of the error if the mode judged by the mode judgment process is coincident with the mode of the record information block including the current information unit when the error is generated. Thus, since the user can recognize the generation of the error, it is possible for the user to promptly cope with this error.

In another aspect of the program storage device of the present invention, the record information blocks are inputted from an external computer device. The method processes are further provided with an input process of inputting the record information blocks through an I/O (Input/Output) interface from the external computer device into the apparatus.

In another aspect of the program storage device of the present invention, the record information blocks are inputted from an external communication device. The method processes are further provided with an input process of inputting the record information blocks through an I/O (Input/Output) interface from the external communication device into the apparatus.

In another aspect of the program storage device of the present invention, the recording process may be a light beam type recording process of recording the emulated or re-emulated information units onto a predetermined record sheet by use of a light beam. Thus, the information units can be recorded sharply on the record sheet.

In another aspect of the program storage device of the present invention, the recording process may be an ink jet type recording process of recording the emulated or re-emulated information units onto a predetermined record sheet by use of an ink jet. Thus, it is possible to reduce the size of the recording device as well as the information recording apparatus as a whole.

In another aspect of the program storage device of the present invention, the method processes are further provided with a temporarily storing process of temporarily storing the inputted record information blocks into a buffer memory device. And that, the emulation process emulates and the re-emulation process re-emulates the information units stored in the buffer memory device. Thus, the emulation process by use of the appropriate emulation method can be speedily and reliably performed.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, an embodiment of the present invention will be now explained. It is explained hereinbelow a case of applying the present invention to a printer apparatus, as one example of the information recording apparatus, connected to a host computer for recording the record information processed and outputted by the host computer onto a predetermined record sheet.

(I) Construction of Printer Apparatus

First of all, a schematic construction of a printer apparatus to which the present invention is applied is explained with reference to FIG. 1.

Figure 1:
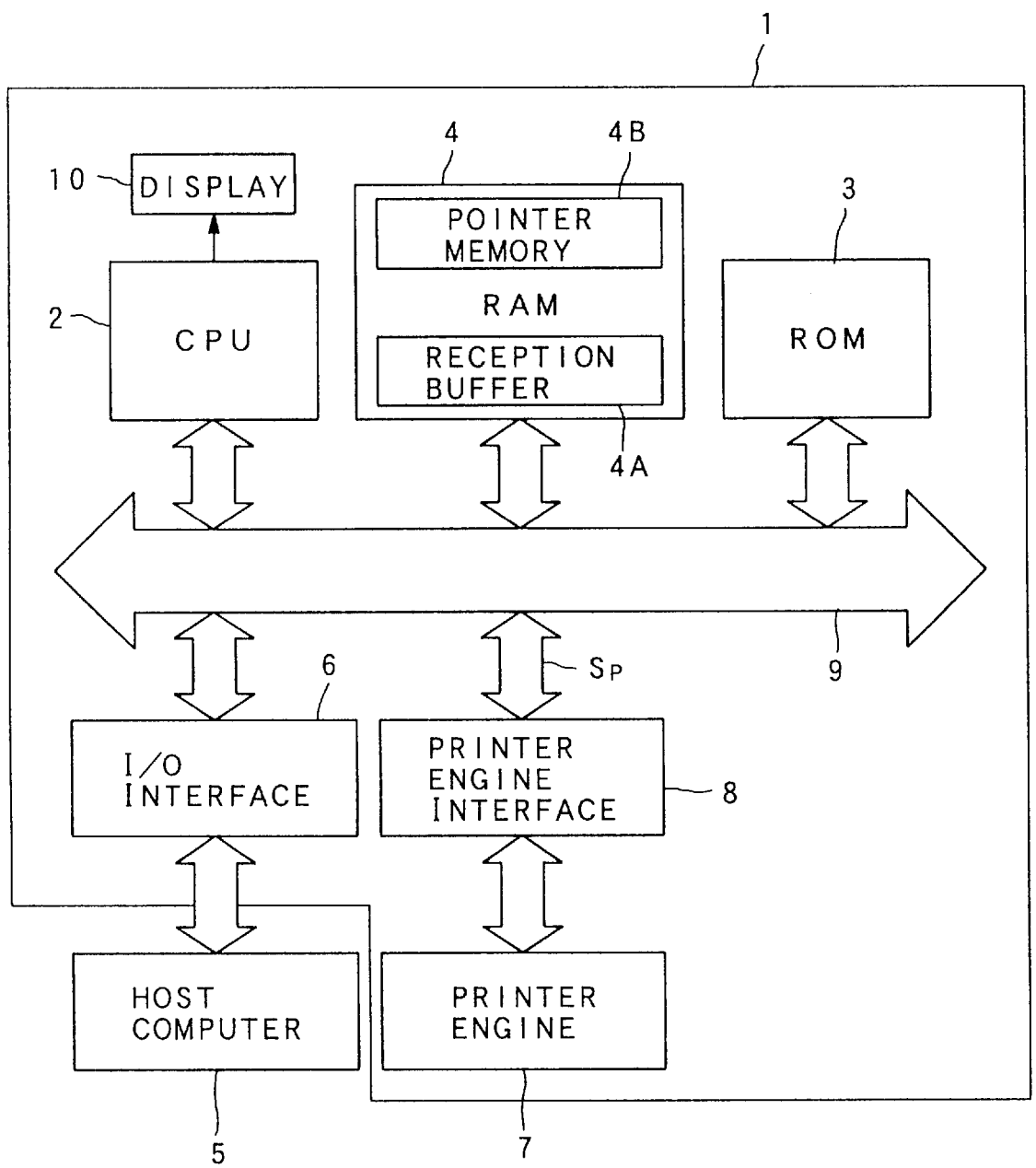
FIG. 1 is a block diagram of a printer apparatus as an embodiment of the present invention.

In FIG. 1, a printer apparatus 1 as an embodiment of the present invention is provided with: a CPU (Central Processing Unit) 2; a ROM (Read Only Memory) 3; a RAM (Random Access Memory) 4; an I/O (Input/Output) interface 6; a printer engine 7, such as a laser printer engine, an ink jet printer engine or the like; a printer engine interface 8; a communication bus 9; and a display unit 10.

The RAM 4 includes a reception buffer 4A and a pointer memory 4B.

Next, a whole operation of the printer apparatus 1 is explained.

The record information outputted from an external host computer 5 is inputted to the bus 9 through the I/O interface 6, which performs the interface operation with respect to the record information. At this time, the record information is divided for each predetermined data into a plurality of command units. The record information is inputted in such a state that a pointer is appended at the head of each of these command units. Further, it is assumed that, as the record information, record information blocks in different modes, which are to be emulated for recording by different emulation processes, such as the aforementioned PS mode emulation process, the aforementioned PC mode emulation process and the like, are continuously inputted in time sequence.

Then, the record information inputted to the bus 9 is temporarily stored in the reception buffer 4A in the RAM 4.

After that, the CPU 2 executes the emulation switching process and the emulation process etc. described later in detail by use of the pointer memory 4B, with respect to the record information stored in the reception buffer 4A, and outputs the result as a processed signal Sp (i.e. the signal emulated by the appropriate emulation process) to the printer engine interface 8 through the bus 9. At this time, the control program to execute the emulation switching process and the emulation process etc. is stored in advance in the ROM 3, so that it is read out to the CPU 2 through the bus 9 as the occasion demands.

After that, the record information after the emulation process, which is inputted as the processed signal Sp to the printer engine interface 8, is outputted to the printer engine 7. For example, in case that the printer engine 7 is a laser printer engine, recording in correspondence with the record information is performed by driving a laser diode to emit a laser beam onto a photo-sensitive dram so that an electrostatic latent image corresponding to the record information is formed on the photo-sensitive dram, by applying toners etc. onto the electrostatic latent image and by transferring the toners onto a record sheet.

(II) Operation of Emulation Switching Process

Figure 2:
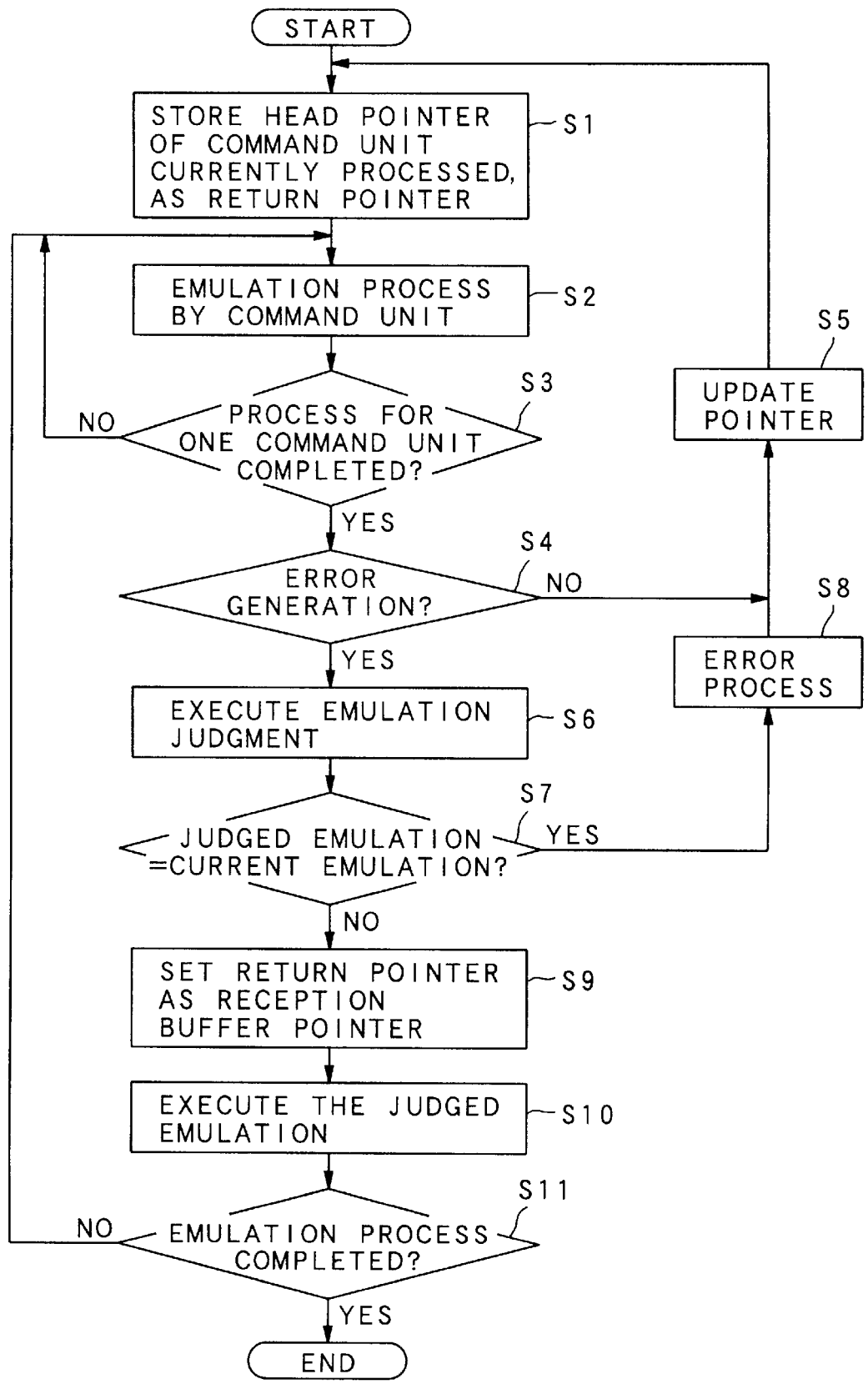
FIG. 2 is a flow chart indicating an emulation switching process of the embodiment.
Figure 3:
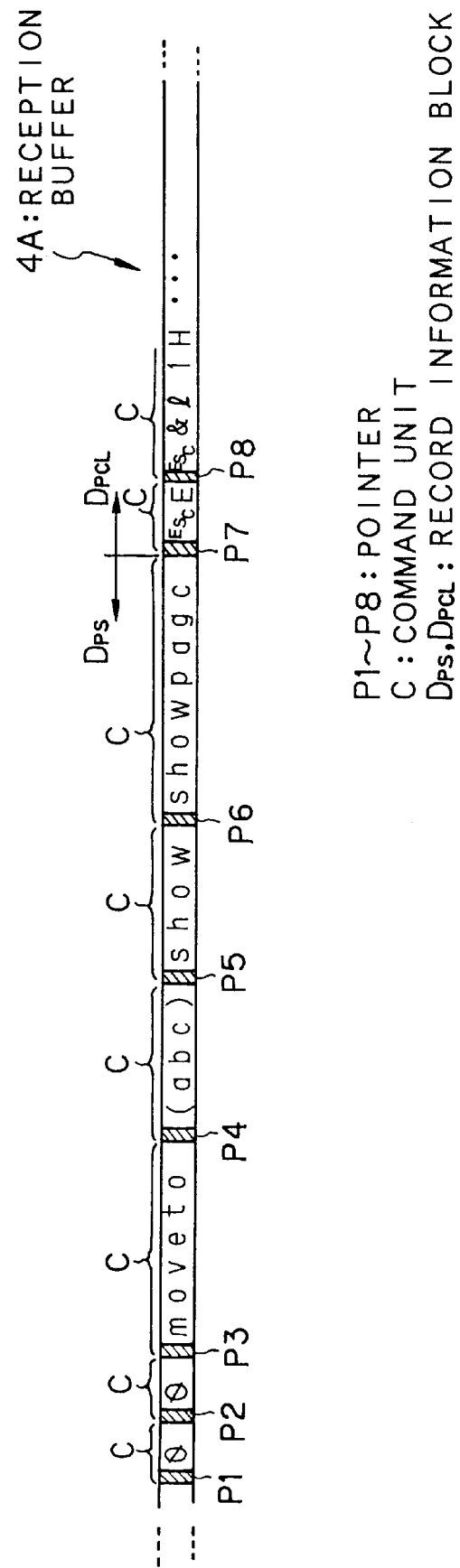
FIG. 3 is a diagram showing one example of record information in a reception buffer of the embodiment.

Next, the operation for the emulation switching process is explained with reference to FIGS. 2 and 3. FIG. 2 is a flow chart of the operation, and FIG. 3 is a diagram showing one example of the recording condition of the record information in the reception buffer 4A. In the example shown in FIG. 3, the recording condition where, after the record information block $D_{PS}$ in the PS mode is inputted and stored into the reception buffer 4A through the bus 9, the record information block $D_{PCL}$ is successively inputted and stored into the reception buffer 4A through the bus 9, is indicated. In the reception buffer 4A shown in FIG. 3, pointers P1 to P8 are appended to each of the command units C in the record information blocks $D_{PS}$ and $D_{PCL}$. Each of the pointers P1 to P8 indicates a head of respective one of the command units C.

The processes, such as a judgment process and the like indicated in the flow chart of FIG. 2 are mainly executed by the CPU 2.

The program corresponding to the flow chart of the embodiment described below is stored in the ROM 3 in advance, and is read out therefrom by the CPU 2 in operation. In the present embodiment, the ROM 3 as one example of a program storage device, tangibly embodies a program of instructions executable by the CPU 2 to perform method processes for emulating each of the information record blocks by use of an appropriate emulation method as explained in detail with reference to the flow chart of FIG. 2. The program may be stored in and read from a known program storage device other than the ROM 3, such as an IC (Integrated Circuit) card, a floppy disk or the like. Alternatively, the program may be stored in the program storage device such as a CD-ROM (Compact Disc-ROM) or the like, read by the host computer 5, transmitted from the host computer 5 to the printer device 1 as the occasion demands, and stored in a predetermined area of the RAM 4.

As shown in FIG. 2, in the emulation switching process of the present embodiment, when the emulation process (routine) is started, the head or first pointer P of the command unit C, which is currently processed, is stored as a return pointer in the pointer memory 4B (step S1). The emulation process for the record information included in the pertinent command unit C is executed for each command unit C (step S2).

Then, it is judged whether or not the emulation process for one command unit C is completed (step S3). If it is not completed (step S3: NO), the operation flow returns to the step S2 so as to continue the emulation process. If it is completed (step S3: YES), it is judged whether or not an error has been generated in the emulation process in the CPU 2 (step S4). Namely, it is judged that the error is generated if the record information block cannot be emulation-processed anymore by the emulation process which has been executed hitherto (more concretely, if the emulation process of the current record information block is attempted which does not exist on the exchange table to exchange the record information to the print data in the pertinent emulation process). In the example shown in FIG. 3, since the emulation is switched for the command units C after the pointer P7, the error is supposed to be generated during the emulation process of the command unit C which has the pointer P7 at the head thereof (i.e., when the pertinent pointer P7 is already stored in the pointer memory 4B).

According to the judgment at the step S4, if the error is not generated (step S4: NO), the pointer P is updated so as to execute the emulation process which has been executed hitherto with respect to the command unit C which is stored in the reception buffer 4A (step S5). Then, the operation flow returns to the step S1, so as to execute the emulation process with respect to the command unit C which has the updated pointer P at the head thereof.

On the other hand, according to the judgment at the step S4, if the error is generated (step S4: YES), the emulation process is temporarily stopped. Then, the emulation judgment is performed on the basis of the data of the command unit C which has the return pointer at the head thereof (e.g. the pointer P7 in the example shown in FIG. 3) which is currently stored in the pointer memory 4 (step S6). The emulation judgment at the step S6 is, more concretely, performed by discriminating or identifying the type of the record information such as the emulation command included in the command unit C, which is the object for the judgment, at the CPU 2. Incidentally, the data, which has been emulation-processed until the error is generated and which is included in the command unit C in which the pertinent error is generated, is destroyed and discarded at the time when the error generation is judged (step S4).

After the judgment of the emulation at the step S6, on the basis of the judgment result, it is judged whether or not this judged emulation in the command unit C (in which the error has been generated) is equal to the current emulation, which has been executed hitherto. Then, if they are different from each other (step S7: NO), the return pointer (e.g. the pointer P7 in case of FIG. 3) is set as a pointer at which the emulation process is to be resumed in the reception buffer 4A (step S9). Then, the emulation process is resumed by use of the emulation (e.g. the PCL in case of FIG. 3) which has been judged at the step S6 (step S10). Then, it is judged whether or not the emulation process with respect to all of the record information has been completed (step S11). If it is not completed (step S11: NO), the operation flow returns to the step S2 so as to continue the emulation process. If it is completed (Step S11: YES), the emulation process is ended.

At the step S7, if the judged emulation is the same as the current emulation which has been executed (step S7: YES), since it is concluded that the error is generated in the emulation process itself other than the emulation switching process, an error process such as a display of the error condition on the display unit 10 and the like is performed (step S8). Then, the pointer is updated so as to execute the emulation process for the record information in the next command unit C (Step S5), and the operation flow returns to the step S1.

As described above in detail, according to the emulation switching process of the present embodiment, on the basis of the pointer P of the command unit C which is being emulated at the time when the error is generated, the emulation process is performed again by use of the emulation process corresponding to the record information in the pertinent command unit C. Therefore, each of the record information blocks can be precisely emulated by use of the appropriate emulation process respectively even in case that the record information blocks in various modes which are to be emulated by different emulation processes from each other are continuously inputted in time sequence.

Further, when the error is generated, the attribute of the record information block ($D_{PS}$ or $D_{PCL}$) in which the command unit C indicted by the pointer P stored in the pointer memory 4B is judged. And that, the record information block, which includes the command unit C, is emulated again and the processed signal Sp is outputted by use of the emulation process corresponding to the judged attribute. Therefore, the emulation process suitable for the record information included in the command unit C can be precisely executed.

On the other hand, if the judged attribute is the same as the attribute of the record information block, which has been emulated until the error is generated, the message indicating this error generation is displayed on the display unit 10. Therefore, the error generation can be easily and promptly recognized by the user, so that it becomes possible to deal with the pertinent error.

Furthermore, in case that the record information is recorded by use of a laser beam by the laser printer engine as one example of the printer engine 7, the record information can be recorded sharply on the record sheet.

In the above described embodiment, the case where the error is detected immediately after the emulation is switched has been explained. However, it is not limited to this. For example, in the actual printer apparatus, there may be raised such a case where the error is not generated even if the emulation is switched, depending upon the content or type of the inputted record information block (e.g., in case that the record information indicates "blank (space)", the error is not generated even if the emulation is switched since the record information in the PS mode is common to that in the PCL mode for this particular record information). However, even in such a case, since the emulation switching process is performed by detecting the error generation for each of the command units C according to the present embodiment, switching of the emulation process can be performed precisely at the time when the error is generated even if the error is not generated at the exact time of switching the emulation.

In the above described embodiment, the case where the record information is inputted from the host computer 5 has been explained. However, it is not limited to this. For example, the present invention can be adapted to the record information which is inputted from a communication apparatus such as a facsimile apparatus or the like.

The present invention can be adapted to a printer engine of so-called ink jet type as well as the laser printer engine by use of the laser beam.

Further, in the above described embodiment, the case where the present invention is adapted to the printer apparatus has been explained. However, it is not limited to this. For example, the present invention can be adapted widely to an apparatus for recording the record information from an external processing device such as the computer, the facsimile apparatus and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus to which record information blocks in various modes, each of which includes a plurality of commands each representing one of a character string to be recorded and a recording control code, are inputted in time sequence, said apparatus comprising:

emulation means for emulating the plurality of commands one after another by use of a predetermined emulation method;

an indicator memory device for temporarily storing a head indicator indicating a current command, which is one of the plurality of commands and is currently emulated by said emulation means;

update means for updating the head indicator stored in said indicator memory device, each time when an emulation for the current command is completed by said emulation means;

error judgment means for judging whether or not an error is generated during the emulation for the current command, said emulation means re-emulating the current command, which is indicated by the head indicator stored in said indicator memory device, by use of another emulation method, which corresponds to a mode of the record information block including the current command and is different from said predetermined emulation method, when the error is generated according to a judgment by said error judgment means; and a recording device for recording in accordance with the emulated command when no error is generated according to the judgment and recording in accordance with the re-emulated command when an error is generated according to the judgment.

2. An apparatus according to claim 1, wherein said error judgment means judges that the error is generated if the current command cannot be emulated by use of said predetermined emulation method.

3. An apparatus according to claim 1, wherein
said emulation means comprises a mode judgment means for judging the mode of the record information block including the current command when the error is generated, and
said emulation means re-emulates the current command by use of said another emulation method corresponding to the mode judged by said mode judgment means.

4. An apparatus according to claim 3, further comprising a notify means for notifying that an error has been generated if the mode judged by said mode judgment means when the error is generated is coincident with the mode of a record information block that has been emulated before the error is generated.

5. An apparatus according to claim 1, wherein
the record information blocks are inputted from an external computer device, and
said apparatus further comprises an I/O (Input/Output) interface for inputting the record information blocks from said external computer device into said apparatus.

6. An apparatus according to claim 1, wherein
the record information blocks are inputted from an external communication device, and
said apparatus further comprises an I/O (Input/Output) interface for inputting the record information blocks from said external communication device into said apparatus.

7. An apparatus according to claim 1, wherein said recording device comprises a light beam type recording device for recording in accordance with the emulated or re-emulated command onto a predetermined record sheet by use of a light beam.

8. An apparatus according to claim 1, wherein said recording device comprises an ink jet type recording device for recording in accordance with the emulated or re-emulated commands onto a predetermined record sheet by use of an ink jet.

9. An apparatus according to claim 1, further comprising a buffer memory device for temporarily storing the inputted record information blocks,
said emulation means emulating and re-emulating the commands included in the record information blocks stored in said buffer memory device.

10. An apparatus according to claim 1, wherein said predetermined emulation method is an emulation method used to emulate a command preceding the current command.

11. A program storage medium readable by an information recording apparatus, to which record information blocks in various modes, each of which includes a plurality of commands each representing one of a character string to be recorded and a recording control code, are inputted in time sequence, for emulating the plurality of commands in the inputted record information blocks and recording in accordance with the emulated commands, tangibly embodying a program of instructions executable by said apparatus to perform method processes for emulating each of the commands by use of an appropriate emulation method, said method processes comprising:
an emulation process of emulating the plurality of commands one after another by use of a predetermined emulation method;
a storing process of temporarily storing, into an indicator memory device of said apparatus, a head indicator indicating a current command, which is one of the plurality of commands and is currently emulated by said emulation process;
an updated process of updating the head indicator stored in said indicator memory device, each time when an emulation for the current command is completed by said emulation process;
an error judgment process of judging whether or not an error is generated during the emulation for the current command;
a re-emulation process of re-emulating the current command, which is indicated by the head indicator stored in said indicator memory device, by use of another emulation method, which corresponds to a mode of the record information block including the current command and is different from said predetermined emulation method, when the error is generated according to a judgment by said error judgment process; and
a recording process of recording in accordance with the emulated command when no error is generated according to the judgment and recording in accordance with the re-emulated command when an error is generated according to the judgment.

12. A program storage medium according to claim 11, wherein said error judgment process judges that the error is generated if the current command cannot be emulated by use of said predetermined emulation method.

13. A program storage medium according to claim 11, wherein
said emulation process comprises a mode judgment process of judging the mode of the record information block including the current command when the error is generated, and
said re-emulation means re-emulates the current command by use of said another emulation method corresponding to the mode judged by said mode judgment process.

14. A program storage medium according to claim 13, wherein said method processes further comprise a notify process of notifying that an error has been generated if the mode judged by said mode judgment process when the error is generated is coincident with the mode of a record information block that has been emulated before the error is generated.

15. A program storage medium according to claim 11, wherein
the record information blocks are inputted from an external computer device, and
said method processes further comprise an input process of inputting the record information blocks through an I/O (Input/Output) interface from said external computer device into said apparatus.

16. A program storage medium according to claim 11, wherein
the record information blocks are inputted from an external communication device, and
said method processes further comprise an input process of inputting the record information blocks through an I/O (Input/Output) interface from said external communication device into said apparatus.

17. A program storage medium according to claim 11, wherein said recording process comprises a light beam type recording process of recording in accordance with the emulated or re-emulated commands onto a predetermined record sheet by use of a light beam.

18. A program storage medium according to claim 11, wherein said recording process comprises an ink jet type recording process of recording the emulated or re-emulated commands onto a predetermined record sheet by use of an ink jet.

19. A program storage medium according to claim 11, wherein said method processes further comprise a temporarily storing process of temporarily storing the inputted record information blocks into a buffer memory device, said emulation process emulating and said re-emulation process re-emulating the commands included in the record information blocks stored in said buffer memory device.

20. A program storage medium according to claim 11, wherein said predetermined emulation method is an emulation method used to emulate a command preceding the current command.

* * * * *